United States Patent
Tian et al.

(10) Patent No.: US 9,553,618 B2
(45) Date of Patent: Jan. 24, 2017

(54) SIGNAL CANCELLATION METHOD AND DEVICE FOR WIRELESS COMMUNICATION SYSTEM

(71) Applicant: ZTE Corporation, Shenzhen, Guangdong (CN)

(72) Inventors: Qi Tian, Shenzhen (CN); Qing Yang, Shenzhen (CN); Yijun Cui, Shenzhen (CN); Jianli Wang, Shenzhen (CN); Baiqing Zong, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/785,851

(22) PCT Filed: Oct. 10, 2013

(86) PCT No.: PCT/CN2013/085003
§ 371 (c)(1),
(2) Date: Oct. 20, 2015

(87) PCT Pub. No.: WO2014/183371
PCT Pub. Date: Nov. 20, 2014

(65) Prior Publication Data
US 2016/0126985 A1    May 5, 2016

(30) Foreign Application Priority Data
May 16, 2013  (CN) .......................... 2013 1 0181061

(51) Int. Cl.
*H04K 1/02*   (2006.01)
*H04B 1/04*   (2006.01)
(Continued)

(52) U.S. Cl.
CPC .......... *H04B 1/0475* (2013.01); *H04B 1/0483* (2013.01); *H04L 25/03* (2013.01); *H04L 27/368* (2013.01)

(58) Field of Classification Search
CPC .... H04L 1/0003; H04L 1/0071; H04L 5/0007; H04L 1/0009; H04L 27/0008; H04L 27/368; H04L 25/03343; H03F 1/3247; H03F 1/3294; H03F 2201/3233
(Continued)

(56) References Cited

U.S. PATENT DOCUMENTS 6,266,517 B1    7/2001   Fitzpatrick
2004/0208259 A1   10/2004   Hunton
(Continued)

FOREIGN PATENT DOCUMENTS

CN    1536797 A    10/2004
CN    101453226 A    6/2009
(Continued)

OTHER PUBLICATIONS

English Translation of the Written Opinion of the International Search Authority in international application No. PCT/CN2013/085003, mailed on Mar. 6, 2014.
(Continued)

*Primary Examiner* — Zewdu Kassa
(74) *Attorney, Agent, or Firm* — Oppedahl Patent Law Firm LLC (57) ABSTRACT

Provided is a signal cancellation method for a wireless communication system, including: splitting a transmitted signal to obtain a main channel signal transmitted on a main channel and an auxiliary channel signal transmitted on an auxiliary channel; performing digital domain channel characteristic matching processing on the main channel signal and the auxiliary channel signal respectively to obtain a main channel characteristic matched signal and an auxiliary channel characteristic matched signal; and combining the main channel characteristic matched signal and the auxiliary channel characteristic matched signal which are coupled to
(Continued)

a receiving channel in order for signal cancellation. A signal cancellation device for a wireless communication system is also provided. Through the technical solution of the disclosure, the signal cancellation problem of a bandwidth can be solved better.

8 Claims, 5 Drawing Sheets

(51) Int. Cl.
*H04L 25/03* (2006.01)
*H04L 27/36* (2006.01)

(58) Field of Classification Search
USPC .................. 375/296, 295, 316, 219
See application file for complete search history.

(56) References Cited

U.S. PATENT DOCUMENTS

| | | | |
|---|---|---|---|
| 2007/0015468 A1* | 1/2007 | Kouki | H04B 1/525 455/63.1 |
| 2008/0075194 A1 | 3/2008 | Ravi | |
| 2008/0198772 A1 | 8/2008 | Loh | |
| 2009/0327384 A1 | 12/2009 | Petrovic | |
| 2011/0228828 A1 | 9/2011 | Wang | |
| 2012/0070159 A1 | 3/2012 | Ishihara | |
| 2012/0224653 A1 | 9/2012 | Lozhkin | |
| 2012/0230227 A1* | 9/2012 | Weiss | H04B 1/52 370/277 |

FOREIGN PATENT DOCUMENTS

| | | |
|---|---|---|
| CN | 102422571 A | 4/2012 |
| JP | 2003520549 A | 7/2003 |
| JP | 2009194639 A | 8/2009 |
| WO | 2009158437 A1 | 12/2009 |

OTHER PUBLICATIONS

International Search Report in international application No. PCT/CN2013/085003, mailed on Mar. 6, 2014.

Supplementary European Search Report in European application No. 13884945.0, mailed on Feb. 10, 2016.

\* cited by examiner

SIGNAL CANCELLATION METHOD AND DEVICE FOR WIRELESS COMMUNICATION SYSTEM

TECHNICAL FIELD

The disclosure relates to the field of wireless communications, and more particularly to a signal cancellation method and device for a wireless communication system.

BACKGROUND

In a wireless communication system, in order to prevent each part of the system from interfering with one another and ensure the internal electromagnetic compatibility of the system and the normal operation of each part, such passive means as shielding, filtering and wave absorption are usually adopted to enhance isolation and the like, and ensure that the mutual influence can be ignored. Whereas, when passive shielding, passive filtering and wave absorption and other means are adopted, a device has a large volume and weight and a relatively high cost.

With the development of the communication technology, operators have an increasingly high demand on the miniaturization and light weight of a wireless communication device. And the miniaturization of the wireless communication device also meets the trend of greenness and low carbon. The traditional isolation means cannot meet the demand of miniaturization of the device easily.

For the analog domain interference cancellation technology in the conventional art, the matching of channel characteristics is carried out in an analog domain, and amplitude, phase, delay and other characteristics cannot be controlled very finely and are controlled integrally according to a channel granularity, so that the influence of fluctuation of in-band characteristics on a cancellation result cannot be solved, and accordingly, a bandwidth cannot be widened, and the analog domain interference cancellation technology is only suitable for narrow-band cancellation.

SUMMARY

The objectives of embodiments of the disclosure are to provide a signal cancellation method and a signal cancellation device for a wireless communication system, in order to solve the problem of signal cancellation of a broadband.

An embodiment of the disclosure provides a signal cancellation method for a wireless communication system, including: a transmitted signal is split to obtain a main channel signal transmitted on a main channel and an auxiliary channel signal transmitted on an auxiliary channel; the main channel signal and the auxiliary channel signal are subjected to digital domain channel characteristic matching processing respectively to obtain a main channel characteristic matched signal and an auxiliary channel characteristic matched signal; and the main channel characteristic matched signal and the auxiliary channel characteristic matched signal which are coupled to a receiving channel are combined in order for signal cancellation.

Preferably, the step that the main channel signal and the auxiliary channel signal are subjected to digital domain channel characteristic matching processing respectively to obtain a main channel characteristic matched signal and an auxiliary channel characteristic matched signal may include: the main channel signal transmitted on the main channel is subjected to digital domain fixed delay processing to obtain the main channel characteristic matched signal; and the auxiliary channel signal transmitted on the auxiliary channel is subjected to digital domain matching filtering processing to obtain the auxiliary channel characteristic matched signal.

Preferably, the step that the main channel signal and the auxiliary channel signal are subjected to digital domain channel characteristic matching processing respectively to obtain a main channel characteristic matched signal and an auxiliary channel characteristic matched signal may include: the main channel signal transmitted on the main channel is subjected to digital domain fixed delay processing to obtain the main channel characteristic matched signal; and the auxiliary channel signal transmitted on the auxiliary channel is subjected to digital domain phase adjustment, amplitude adjustment and delay adjustment to obtain the auxiliary channel characteristic matched signal.

Preferably, the step that the main channel signal and the auxiliary channel signal are subjected to digital domain channel characteristic matching processing respectively to obtain a main channel characteristic matched signal and an auxiliary channel characteristic matched signal may include: the main channel signal transmitted on the main channel is subjected to digital domain fixed delay processing to obtain the main channel characteristic matched signal; the auxiliary channel signal transmitted on the auxiliary channel is subjected to digital domain band splitting to obtain multiple auxiliary channel sub-signals; each auxiliary channel input sub-signal is subjected to matching filtering processing, or subjected to phase adjustment, amplitude adjustment and delay adjustment to obtain multiple auxiliary channel characteristic matched sub-signals; and the multiple auxiliary channel characteristic matched sub-signals are combined to obtain the auxiliary channel characteristic matched signal.

Preferably, after the combination, the method may further include: an output signal obtained by the combination is detected; when the output signal is detected, a carrier energy value of the output signal is compared with an energy threshold; when it is determined that the carrier energy value of the output signal is larger than the energy threshold, channel characteristics of the main channel and the auxiliary channel are adjusted according to the carrier energy value of the output signal to enable the signal transmitted on the main channel and the signal transmitted on the auxiliary channel to cancel out each other; and when it is determined that the carrier energy value of the output signal is smaller than or equal to the energy threshold, the channel characteristics of the main channel and the auxiliary channel are maintained.

An embodiment of the disclosure further provides a signal cancellation device for a wireless communication system, including a splitting module, a digital domain channel characteristic matching executing module and a cancellation module, wherein the splitting module is configured to split a transmitted signal to obtain a main channel signal transmitted on a main channel and an auxiliary channel signal transmitted on an auxiliary channel; the digital domain channel characteristic matching executing module is configured to perform digital domain channel characteristic matching processing on the main channel signal and the auxiliary channel signal respectively to obtain a main channel characteristic matched signal and an auxiliary channel characteristic matched signal; and the cancellation module is configured to combine the main channel characteristic matched signal and the auxiliary channel characteristic signal which are coupled to a receiving channel in order for signal cancellation.

Preferably, the digital domain channel characteristic matching executing module may include a fixed delayer and a digital matching filter, wherein the fixed delayer is configured to perform digital domain fixed delay processing on the main channel signal transmitted on the main channel to obtain the main channel characteristic matched signal; and the digital matching filter is configured to perform digital domain matching filtering processing on the auxiliary channel signal transmitted on the auxiliary channel to obtain the auxiliary channel characteristic matched signal.

Preferably, the digital domain channel characteristic matching executing module may include a fixed delayer and a phase amplitude delay adjuster, wherein the fixed delayer is configured to perform digital domain fixed delay processing on the main channel signal transmitted on the main channel to obtain the main channel characteristic matched signal; and the phase amplitude delay adjuster is configured to perform digital domain phase adjustment, amplitude adjustment and delay adjustment on the auxiliary channel signal transmitted on the auxiliary channel to obtain the auxiliary channel characteristic matched signal.

Preferably, the digital domain channel characteristic matching executing module may include a fixed delayer, multiple band-pass filters, a digital matching filter or a phase amplitude delay adjuster, and a combiner, wherein the fixed delayer is configured to perform digital domain fixed delay processing on the main channel signal transmitted on the main channel to obtain the main channel characteristic matched signal; the multiple band-pass filters are configured to perform digital domain band splitting on the auxiliary channel signal transmitted on the auxiliary channel to obtain multiple auxiliary channel sub-signals; the digital matching filter is configured to perform matching filtering processing on each auxiliary channel input sub-signal to obtain multiple auxiliary channel characteristic matched sub-signals; the phase amplitude delay adjuster is configured to perform phase adjustment, amplitude adjustment and delay adjustment on the each auxiliary channel input sub-signal to obtain multiple auxiliary channel characteristic matched sub-signals; and the combiner is configured to combine the multiple auxiliary channel characteristic matched sub-signals to obtain the auxiliary channel characteristic matched signal.

Preferably, the device may further include a channel characteristic calculation control module which includes a first detector, a first comparator, a first adjustor and a first maintainer, wherein the first detector is configured to detect an output signal obtained by the combination; the first comparator is configured to, when the output signal is detected, compare a carrier energy value of the output signal with an energy threshold; the first adjustor is configured to, when it is determined that the carrier energy value of the output signal is larger than the energy threshold, adjust channel characteristics of the main channel and the auxiliary channel according to the carrier energy value of the output signal to enable the signal transmitted on the main channel and the signal transmitted on the auxiliary channel to cancel out each other; and the first maintainer is configured to, when it is determined that the carrier energy value of the output signal is smaller than or equal to the energy threshold, maintain the channel characteristics of the main channel and the auxiliary channel.

According to the signal cancellation method and the signal cancellation device for a wireless communication system, firstly, a transmitted signal is split to obtain a main channel signal transmitted on a main channel and an auxiliary channel signal transmitted on an auxiliary channel; secondly, the main channel signal and the auxiliary channel signal are subjected to digital domain channel characteristic matching processing respectively to obtain a main channel characteristic matched signal and an auxiliary channel characteristic matched signal; and finally, the main channel characteristic matched signal and the auxiliary channel characteristic matched signal which are coupled to a receiving channel are combined in order for signal cancellation; thus, in the embodiments, the channel characteristic matching control is implemented in a digital domain to enable the signals which share a same source and are transmitted on different paths to cancel out each other to achieve the aim of eliminating signal leakage, i.e., signal interference. Compared with the analog domain signal cancellation technology, the disclosure has a finer control and a good cancellation effect, and is particularly suitable for the signal cancellation of broadband.

DETAILED DESCRIPTION

The preferred embodiments of the disclosure are described below with reference to the drawings, and it should be understood that the preferred embodiments herein are intended to describe and explain the technical solution of the disclosure instead of limiting the protection scope of the disclosure.

Figure 1:
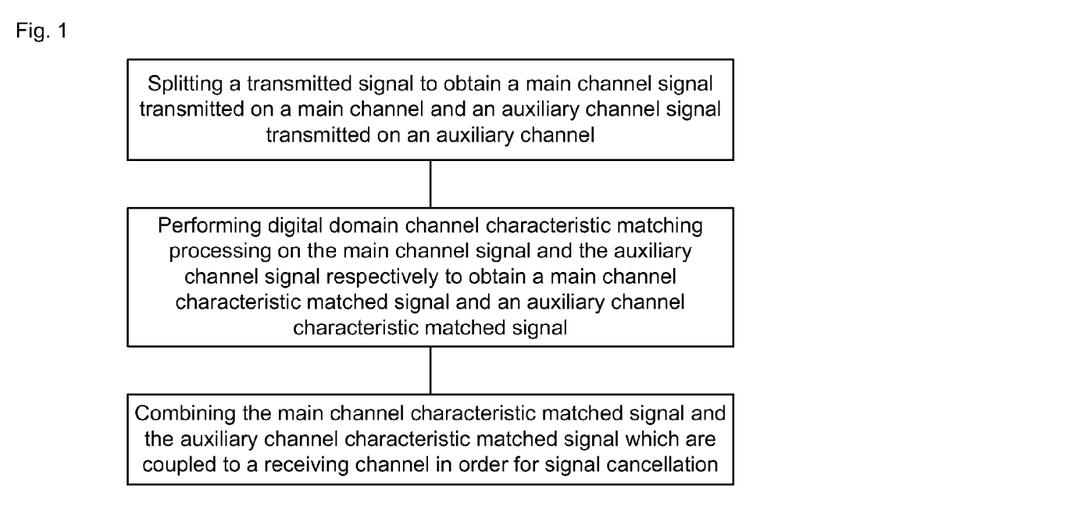
FIG. 1 is a diagram showing an implementing flow of a signal cancellation method for a wireless communication system provided by an embodiment of the disclosure.

FIG. 1 is a diagram showing an implementing flow of a signal cancellation method for a wireless communication system provided by an embodiment of the disclosure. As shown in FIG. 1, the method includes:

Step S11: A transmitted signal is split to obtain a main channel signal transmitted on a main channel and an auxiliary channel signal transmitted on an auxiliary channel.

Here, the main channel and the auxiliary channel are linear channels and include but are not limited to an amplifying unit, an attenuation unit, a filtering unit, a frequency-variable unit, an Analog to Digital Converter (ADC), a Digital to Analog Converter (DAC), a power amplifying unit and other linear units.

Step S12: The main channel signal and the auxiliary channel signal are subjected to digital domain channel characteristic matching processing respectively to obtain a main channel characteristic matched signal and an auxiliary channel characteristic matched signal.

Here, the step that the main channel signal and the auxiliary channel signal are subjected to digital domain channel characteristic matching processing respectively to obtain a main channel characteristic matched signal and an auxiliary channel characteristic matched signal may include:

the main channel signal transmitted on the main channel is subjected to digital domain fixed delay processing to obtain the main channel characteristic matched signal;

the auxiliary channel signal transmitted on the auxiliary channel is subjected to digital domain matching filtering processing to obtain the auxiliary channel characteristic matched signal; or, the auxiliary channel signal transmitted on the auxiliary channel is subjected to digital domain phase adjustment, amplitude adjustment and delay adjustment to obtain the auxiliary channel characteristic matched signal; or, the auxiliary channel signal transmitted on the auxiliary channel is subjected to digital domain band splitting to obtain multiple auxiliary channel sub-signals, then, each auxiliary channel input sub-signal is subjected to matching filtering processing or subjected to phase adjustment, amplitude adjustment and delay adjustment to obtain multiple auxiliary channel characteristic matched sub-signals; and the multiple auxiliary channel characteristic matched sub-signals are combined to obtain the auxiliary channel characteristic matched signal.

Step S13: The main channel characteristic matched signal and the auxiliary channel characteristic matched signal which are coupled to a receiving channel are combined in order for signal cancellation.

After Step S13, the method may further include:
the obtained output signal is detected;
when the output signal is detected, the carrier energy value of the output signal is compared with an energy threshold;
when it is determined that the carrier energy value of the output signal is larger than the energy threshold, the channel characteristics of the main channel and the auxiliary channel are adjusted according to the carrier energy value of the output signal to enable the signal transmitted on the main channel and the signal transmitted on the auxiliary channel to cancel out each other; and
when it is determined that the carrier energy value of the output signal is smaller than or equal to the energy threshold, the channel characteristics of the main channel and the auxiliary channel are maintained.

Figure 2:
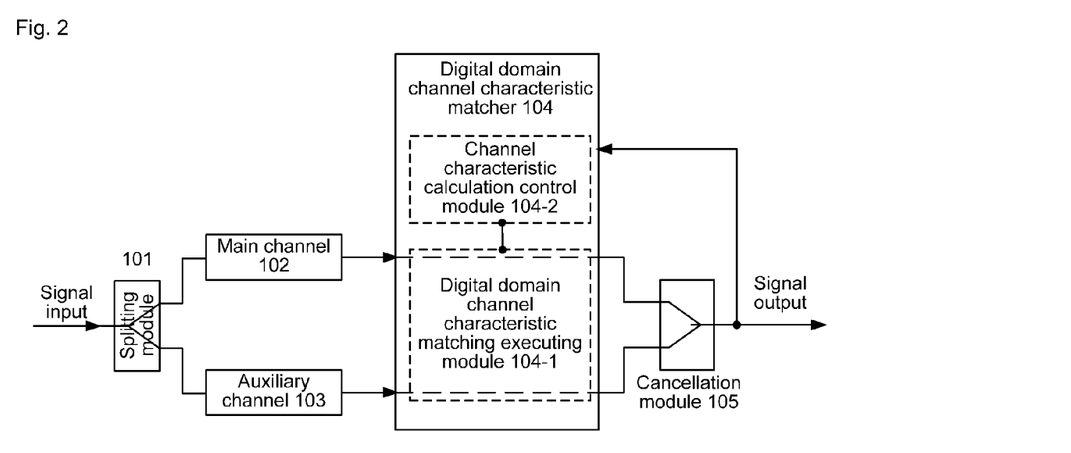
FIG. 2 is a diagram showing a composition structure of a signal cancellation device for a wireless communication system provided by an embodiment of the disclosure.

FIG. 2 is a diagram showing a composition structure of a signal cancellation device for a wireless communication system provided by an embodiment of the disclosure. As shown in FIG. 2, the device includes a splitting module 101, a main channel 102, an auxiliary channel 103, a digital domain channel characteristic matcher 104 and a cancellation module 105.

Here, the splitting module 101 is configured to split a transmitted signal to obtain a main channel signal transmitted on the main channel 102 and an auxiliary channel signal transmitted on the auxiliary channel 103. That is to say, the splitting module 101 splits the input transmitted signal into two-channel signals which are transmitted to the main channel and the auxiliary channel respectively; and the splitting module may be an in-phase splitter, an anti-phase splitter, a 3 dB bridge, an unequal splitter, a multi-channel splitter, a coupler and the like according to the actual requirement.

Here, the main channel 102 and the auxiliary channel 103 may be in a pure digital mode, an analog and digital combined mode or a pure analog mode according to the actual condition. The main channel 102 and the auxiliary channel 103 may include but are not limited to an amplifying unit, an attenuation unit, a filtering unit, a frequency-variable unit, an ADC or a DAC, a power amplifying unit and other linear units. When a link index is allocated in the implementation process, the link gain difference, phase difference and propagation delay difference between the main channel and the auxiliary channel should be matched within the adjustment range of the digital domain channel characteristic matcher 104.

To ensure a good cancellation result, if the main channel 102 and the auxiliary channel 103 have a frequency-variable unit, it is required that a frequency-variable clock or a local oscillator of the cancellation device must be directly from a same source. Being directly from a same source means that they are output from a same oscillation source instead of locking one reference source which is an indirect way, namely, they are input from a same oscillation source, and then subjected to splitting, channel transmission and some necessary linear transformation to serve as the clocks or the local oscillators of the main and the auxiliary channels.

To ensure a good cancellation effect, the sampling clocks of A/D or D/A of the main channel 102 and the auxiliary channel 103 must be directly from a same source instead of locking a reference source which is an indirect way, namely, they are input from a same oscillating source and then subjected to splitting, channel transmission and some necessary linear transformation to server as the clocks or local oscillators of the main and the auxiliary channels. In terms of need of the ND and D/A, the sampling clocks are selected with low bottom noise and high saturation power as a principle.

To ensure a good cancellation effect, it is required that the amplitude-frequency characteristics and the group delay characteristics of the auxiliary channel 103 should be as flat as possible in a target cancellation band; moreover, the requirement on the energy of the spurious and nonlinear products and noise generated by the auxiliary channel 103 falling from the input end of the cancellation module 105 into a cancellation band is as follows: the energy spectrum density of the spurious and nonlinear products and the noise is smaller than or equal to the difference obtained by subtracting 10 and a target cancellation amount (dB) from the energy spectrum density of a sampling signal. Preferably, to ensure a good cancellation effect, for the auxiliary channel 103, if a splitting point has a frequency component which is much higher than a target band, such measures as filtering must be adopted to suppress these irrelevant frequency components to ensure that the auxiliary channel 103 is in a good status.

Here, the digital domain channel characteristic matcher 104 adjusts the amplitude, phase, delay and other parameters of the main channel and/or the auxiliary channel in the digital domain so that the signals of the two channels have the same amplitude and delay and opposite phase at a combination point of the cancellation module 105. The digital domain channel characteristic matcher 104 includes a digital domain channel characteristic matching executing module 104-1 and a channel characteristic calculation control module 104-2, wherein the digital domain channel characteristic matching executing module 104-1 is configured to perform digital domain channel characteristic matching processing on the main channel signal and the auxiliary channel signal to obtain a main channel characteristic matched signal and an auxiliary channel characteristic matched signal. The digital domain channel characteristic matching executing module 104-1 performs channel characteristic matching calculation according to the data and instruction given by the channel characteristic calculation control module 104-2, and executes channel characteristic matching in the digital domain to enable the main channel and the auxiliary channel to match with each other, so that the signals transmitted on the main channel and the auxiliary channel cancel out each other at the combination point of the cancellation module 105.

The channel characteristic calculation control module 104-2 is configured to detect an output signal obtained by the combination; when the output signal is detected, the carrier energy value of the output signal is compared with an energy threshold; if the carrier energy value of the output signal is larger than the energy threshold, the channel characteristics of the main channel and the auxiliary channel are adjusted according to the carrier energy value of the output signal so that the signals transmitted on the main channel and the auxiliary channel cancel out each other; otherwise, the channel characteristics of the main channel and the auxiliary channel are maintained.

The channel characteristic calculation control module 104-2 includes a first detector, a first comparator, a first adjustor and a first maintainer, wherein the first detector is configured to detect the output signal obtained by the combination;

the first comparator is configured to, when the output signal is detected, compare the carrier energy value of the output signal with the energy threshold;

the first adjustor is configured to, when it is determined that the carrier energy value of the output signal is larger than the energy threshold, adjust the channel characteristics of the main channel and the auxiliary channel according to the carrier energy value of the output signal to enable the signals transmitted on the main channel and the auxiliary channel to cancel out each other; and the first maintainer is configured to, when it is determined that the carrier energy value of the output signal is smaller than or equal to the energy threshold, maintain the channel characteristics of the main channel and the auxiliary channel.

That is to say, the channel characteristic matching calculation control module 104-2 calculates the channel characteristics accurately, processes them and sends an instruction and data to the digital domain channel characteristic matching executing module 104-1 for execution to enable the channel characteristics of the main channel and the auxiliary channel to match with one another, so that the signals transmitted on the main channel and the auxiliary channel cancel out each other at the combination point of the cancellation module 105. The matching of channel characteristics of the main channel and the auxiliary channel refers to that the signals transmitted on the main channel and the auxiliary channel have the same amplitude and delay and opposite phase at the combination point of the cancellation module 105.

Here, the cancellation module 105 is configured to combine the main channel characteristic matched signal and the auxiliary channel characteristic matched signal which are coupled to a receiving channel in order for signal cancellation. The cancellation module 105 is basically characterized by having two input ports, one output port and an internal combination end point which is called a combination point for short. The combination point is an intersection point where the internal signals of three ports of the cancellation module are transmitted and interconnected. The cancellation module 105 can be implemented by a combiner/a splitter, a coupler, a bridge and other emulators, or implemented by a summer, a subtracter and other devices in the digital domain. The level and the like of the input end of the cancellation module are determined by a specific device during the link allocation.

That is to say, the transmitted signal is split into two signals by the splitting module 101, one signal is transmitted by the main channel 102 and the other signal is transmitted by the auxiliary channel 103, and the main and the auxiliary channels have own channel characteristics. The channel characteristics are matched for the signal of the main and/or the auxiliary channel by the digital domain channel characteristic matcher 104 in a digital domain, so that the main channel signal and the auxiliary channel signal have same amplitude and delay, opposite phase and the like at the combination point in the cancellation module 105 and then cancel out each other to achieve signal cancellation.

In FIG. 2, the digital domain channel characteristic matcher 104 consists of two parts, a digital domain channel characteristic matching executing module 104-1 and a channel characteristic matching calculation control module 104-2. It is necessary to reserve a plurality of detection input interfaces and a system interaction interface for the channel characteristic matching calculation control module 104-2 and a control interface for the digital domain channel characteristic matching executing module 104-1. In the implementing process, the composition of the digital domain channel characteristic matcher 104 is selected according to different conditions. The composition of the channel characteristic matching module has but is not limited to the circumstances shown in FIGS. 3 to 5.

Figure 3:
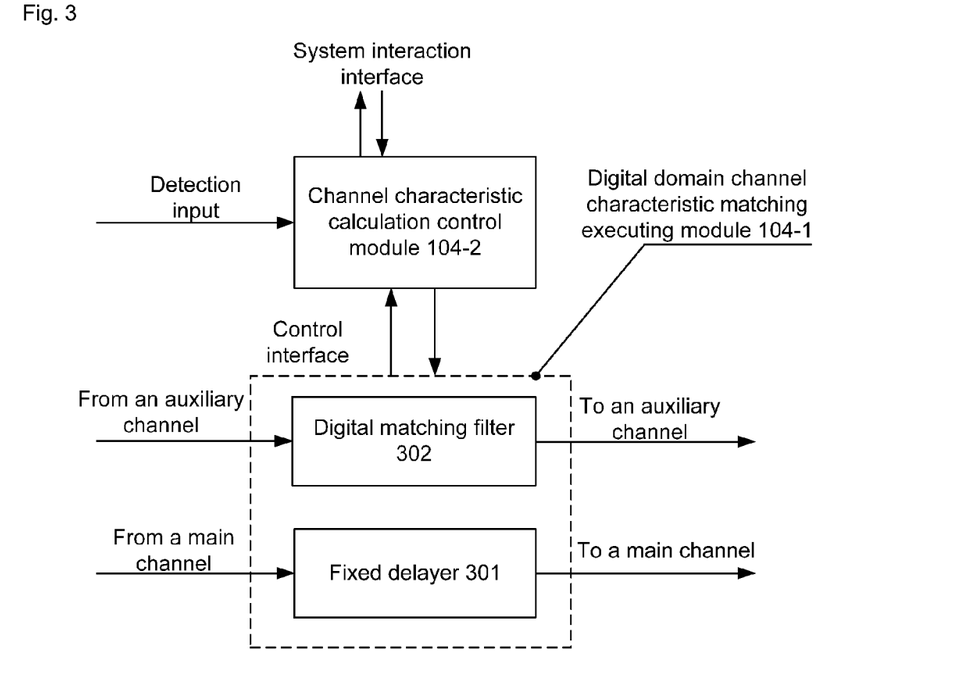
FIG. 3 is a diagram showing a first composition structure of a digital domain channel characteristic matcher shown in FIG. 2.

FIG. 3 is a diagram showing a first composition structure of the digital domain channel characteristic matcher shown in FIG. 2. As shown in FIG. 3, the digital domain channel characteristic matcher includes a digital domain channel characteristic matching executing module 104-1 and a channel characteristic calculation control module 104-2, wherein the digital domain channel characteristic matching executing module 104-1 includes a fixed delayer 301 and a digital matching filter 302.

In FIG. 3, the digital domain channel characteristic matcher utilizes the fixed delayer 301 as a main channel characteristic matching execution module to perform digital domain fixed delay processing on the main channel signal transmitted on the main channel to obtain a main channel characteristic matched signal; and the digital domain channel characteristic matcher utilizes the digital matching filter 302 as an auxiliary channel characteristic matching execution module to perform digital domain matching filtering on the auxiliary channel signal transmitted on the auxiliary channel to obtain an auxiliary channel characteristic matched signal. In such a circumstance, the channel characteristic calculation control module 104-1 calculates and updates the parameters of the digital matching filter 302. The main channel mainly functions to bear normal communication flow, so that the digital matching filter 302 is usually placed on the auxiliary channel in order not to affect the phase characteristics of the main channel. The ways for calculating and updating the parameters of the digital matching filter 302 by the channel characteristic calculation control module 104-1 have but are not limited to a pre-stored offline parameter control way, a periodic channel characteristic monitoring and estimating way, a cancellation effect zero-forcing control way and the like.

Figure 4:
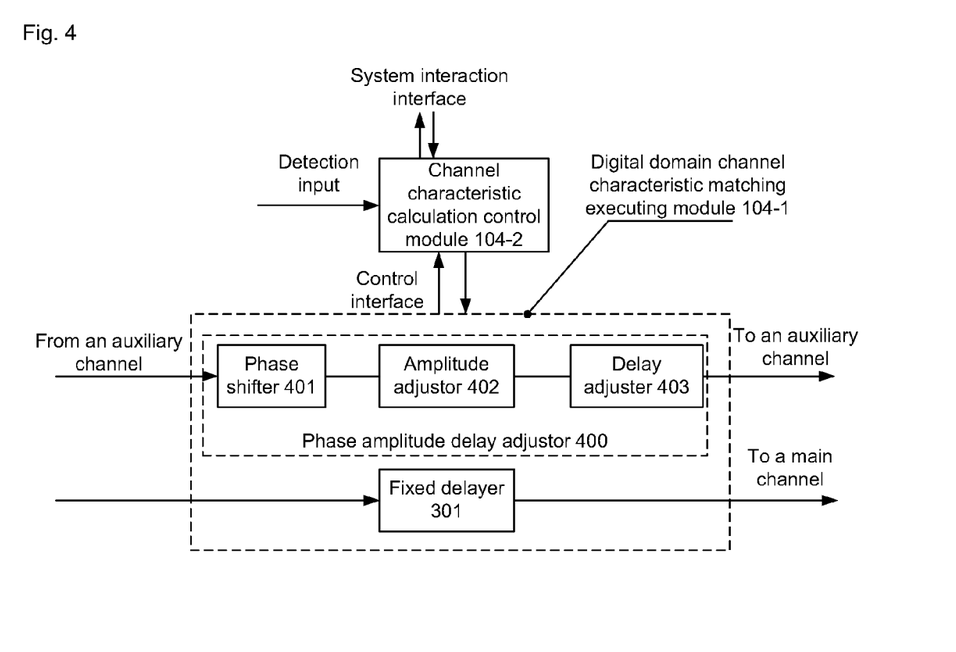
FIG. 4 is a diagram showing a second composition structure of a digital domain channel characteristic matcher shown in FIG. 2.

FIG. 4 is a diagram showing a second composition structure of the digital domain channel characteristic matcher shown in FIG. 2. As shown in FIG. 4, the digital domain channel characteristic matcher includes a digital domain channel characteristic matching executing module 104-1 and a channel characteristic calculation control module 104-2, wherein the digital domain channel characteristic matching executing module 104-1 includes a fixed delayer 301 and a phase amplitude delay adjustor 400; and the phase amplitude delay adjustor 400 includes a phase shifter 401, an amplitude adjustor 402 and a delay adjustor 403.

In FIG. 4, the digital domain channel characteristic matcher utilizes the phase amplitude delay adjustor 400 to achieve the aim of matching channel characteristics. The phase shifter 401, the amplitude adjustor 402 and the delay adjustor 403 can be placed in any position on the main or the auxiliary channel as required, or placed centrally or separately as required. The phase shifter 401 is placed on the main channel or the auxiliary channel and is generally placed on the auxiliary channel. The amplitude adjustor 402 is placed on the main channel or the auxiliary channel and is generally placed on the auxiliary channel. The delay adjustor 403 is placed on one of the main channel and the auxiliary channel, and is generally placed on the auxiliary channel; the delay adjustor 403 can be adjusted only in a lag direction, therefore, if the main channel has a shorter channel delay than the auxiliary channel and the delay adjustor 403 is on the auxiliary channel, the main channel must be provided with a fixed delayer 301 additionally, and the delay value is larger than the delay difference between the main signal and the auxiliary signal. That is to say, the step that the main channel signal and the auxiliary channel signal are subjected to digital domain channel characteristic matching processing respectively includes fixed delay processing, phase adjustment, amplitude adjustment and delay adjustment, wherein the fixed delay processing is finished on the main channel, and the phase adjustment or the amplitude adjustment or the delay adjustment is finished on one of the main channel and the auxiliary channel.

FIG. 4 shows a preferred structure of the digital domain channel characteristic matcher; namely, a fixed delayer 301 is arranged on a main channel to perform digital domain fixed delay processing on a main channel signal transmitted on the main channel to obtain a main channel characteristic matched signal; and a phase shifter 401, an amplitude adjustor 402 and a delay adjustor 403 are arranged on the auxiliary channel to perform digital domain phase adjustment, amplitude adjustment and delay adjustment on an auxiliary channel signal transmitted on the auxiliary channel to obtain an auxiliary channel characteristic matched signal.

Figure 5:
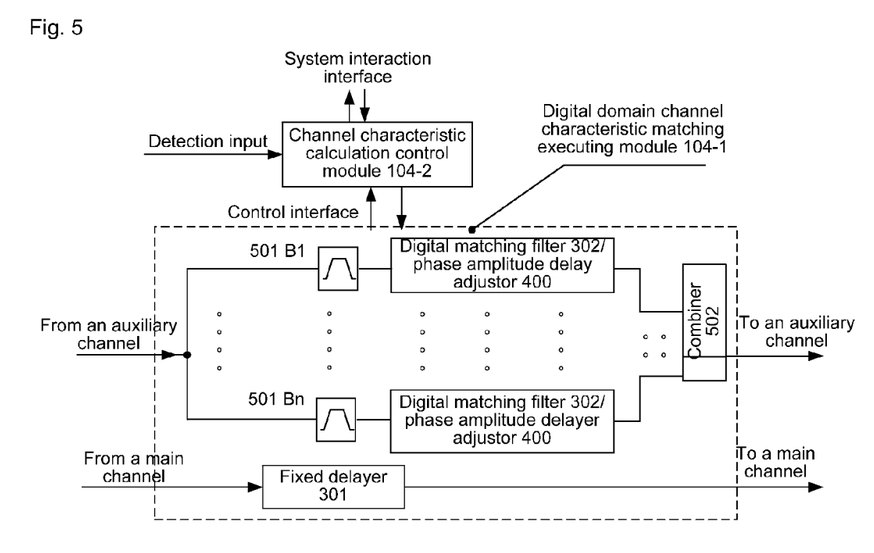
FIG. 5 is a diagram showing a third composition structure of a digital domain channel characteristic matcher shown in FIG. 2.

FIG. 5 is a diagram showing a third composition structure of the digital domain channel characteristic matcher shown in FIG. 2. As shown in FIG. 5, the digital domain channel characteristic matcher includes a digital domain channel characteristic matching executing module 104-1 and a channel characteristic calculation control module 104-2.

The digital domain channel characteristic matcher shown in FIG. 5 is characterized in that a frequency band needing characteristic matching is finely divided into several sub-bands based on FIGS. 3 and 4, and each sub-band is subjected to channel characteristic matching. The granularity of finely dividing a frequency spectrum can be selected intermediately according to a system requirement and a resource requirement. As shown in FIG. 5, a fixed delayer on the main channel is utilized to perform digital domain fixed delay processing on a main channel signal transmitted on the main channel to obtain a main channel characteristic matched signal; firstly, multiple band-pass filters 501 are utilized, i.e., B1 to Bn, to perform digital domain band division on an auxiliary channel signal transmitted on the auxiliary channel to obtain multiple auxiliary channel sub-signals; secondly, a digital matching filter 302 is utilized to perform matching filtering processing on each auxiliary channel input sub-signal, or, a phase amplitude delay adjustor 400 is utilized to carry out phase adjustment, amplitude adjustment and delay adjustment to obtain multiple auxiliary channel characteristic matched sub-signals; and finally, a combiner 502 is utilized to combine the multiple auxiliary channel characteristic matched sub-signals to obtain an auxiliary channel characteristic matched signal.

Figure 6:
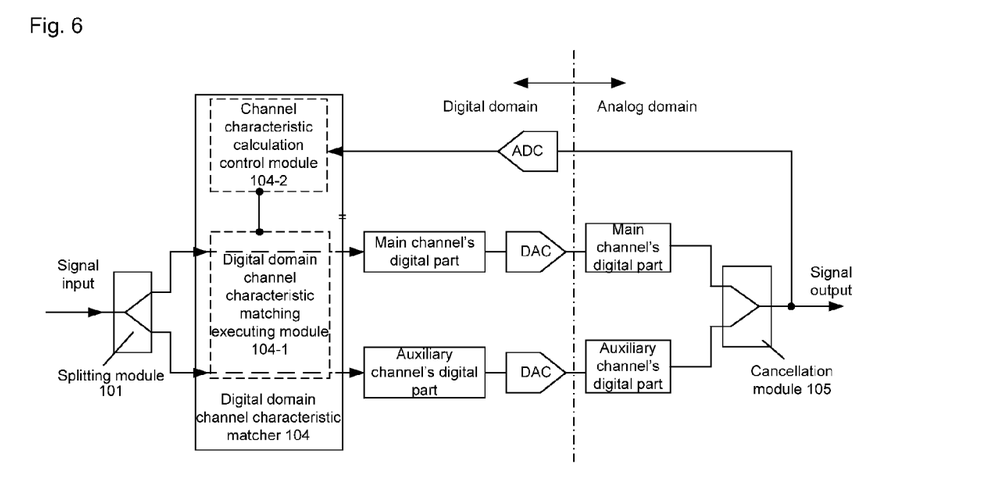
FIG. 6 is a diagram showing a composition structure of a signal cancellation device provided by a first embodiment of the disclosure.
Figure 7:
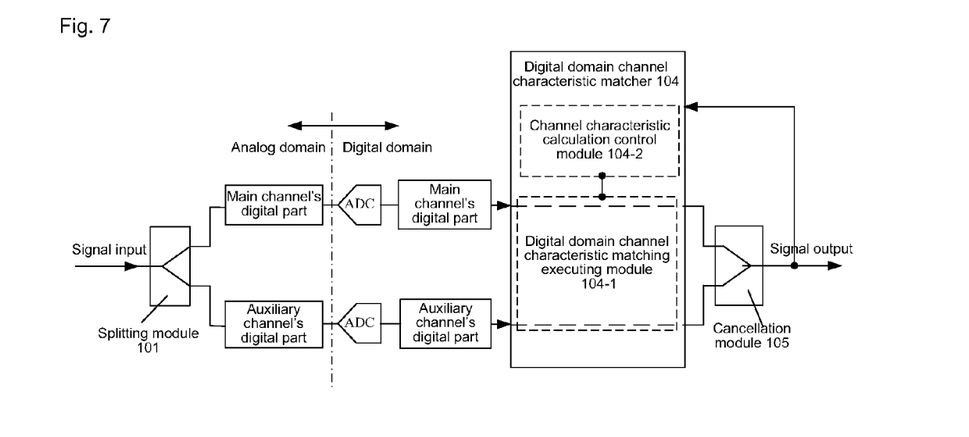
FIG. 7 is a diagram showing a composition structure of a signal cancellation device provided by a second embodiment of the disclosure.
Figure 8:
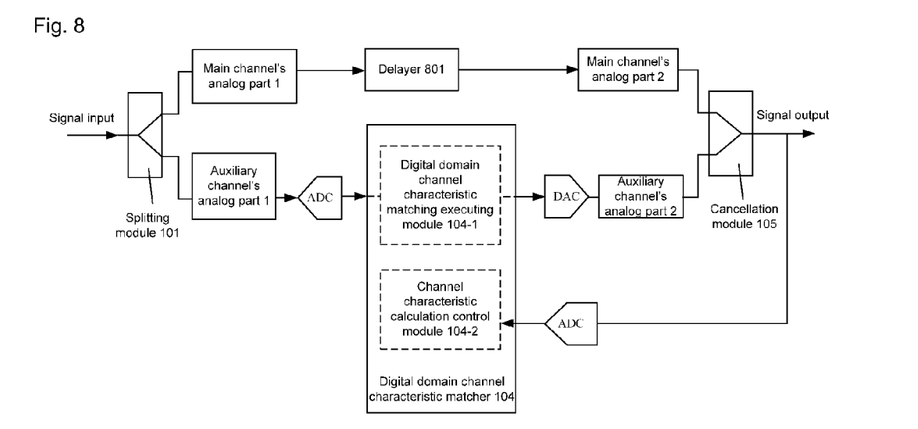
FIG. 8 is a diagram showing a composition structure of a signal cancellation device provided by a third embodiment of the disclosure.

In the specific implementing process, the digital domain channel characteristic matcher can be in various positions in the signal cancellation device according to the actual condition, which are not limited to the circumstances in FIGS. 6 to 8.

FIG. 6 is a diagram showing a composition structure of a signal cancellation device provided by a first embodiment of the disclosure. As shown in FIG. 6, an input part for a transmitted signal, a splitting module 101, a digital domain channel characteristic matcher 104, a main channel's digital part and an auxiliary channel's digital part are in a digital domain; and a main channel's analog part, an auxiliary channel's analog part and a cancellation module 105 are in an analog domain.

FIG. 7 is a diagram showing a composition structure of a signal cancellation device provided by a second embodiment of the disclosure. As shown in FIG. 7, a main channel's digital part, an auxiliary channel's digital part, a digital domain channel characteristic matcher 104, a cancellation module 105 and a signal output part are in a digital domain; and a classification module 101, a main channel's analog part and an auxiliary channel's analog part are in an analog domain.

FIG. 8 is a diagram showing a composition structure of a signal cancellation device in a third embodiment of the disclosure. As shown in FIG. 8, only a digital domain channel characteristic matcher 104 is in a digital domain; and a splitting module 101, main channel's analog parts 1 and 2, auxiliary channel's analog parts 1 and 2, a cancellation module 105 and a delayer 801 are in an analog domain. In such a circumstance, a digital domain channel characteristic matching module 104-1 is placed on an auxiliary channel to carry out phase compensation, amplitude compensation, delay compensation and the like. The auxiliary channel has a relatively large transmission delay in such a circumstance, so that it is necessary to add the delayer 801 on the path of the main channel in order that the transmission delay of the main channel is slightly larger than that of the auxiliary channel.

Figure 9:
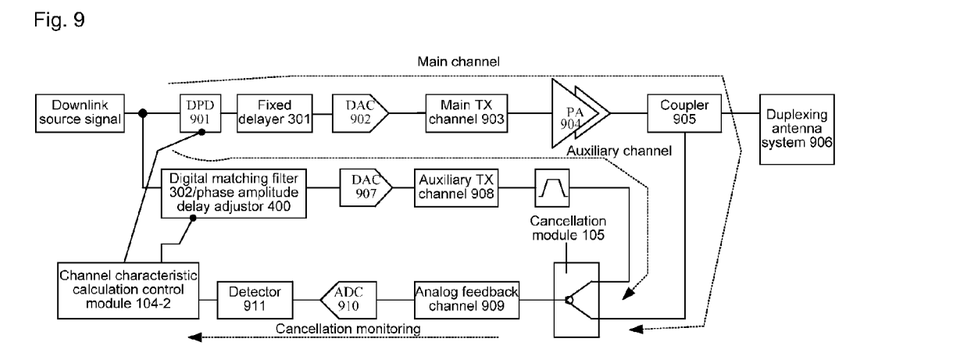
FIG. 9 is a diagram showing a composition structure of a digital control carrier cancellation device provided by a fourth embodiment of the disclosure.

In a Digital Pre-Distortion (DPD) feedback loop, in a traditional way, a carrier signal and a non-linear component are fed back together; and because the carrier signal is high in energy and an ADC is limited in a dynamic range, the fed-back ADC cannot provide a dynamic range meeting the requirements to distinguish the low-energy non-linear residual component if the DPD improvement requirement is high. Therefore, the dynamic condition of the feed-back loop can be improved by carrier cancellation. FIG. 9 is a diagram showing a composition structure of a digital control carrier cancellation device in a fourth embodiment. As shown in FIG. 9, on a DPD downlink transmission channel, a splitting point for carrier cancellation between the main channel and the auxiliary channel can exist between a downlink source signal and a DPD module input, wherein the downlink source signal is a signal obtained by performing channel processing, Digital Up Conversion (DUC) and Crest Factor Ratio (CFR) on an IQ baseband signal. The main channel signal through the splitting point passes through a DPD 901, a fixed delayer 301, a DAC 902, a main transmitting TX analog channel part 903 (main TX channel) and a power amplifier 904, and then passes through a coupler 905; the main energy of the coupler 905 is output to a duplex antenna feeder system 9063; and the sampled energy of the coupler 905 enters a cancellation module 105. An auxiliary channel signal from the splitting point is input to the cancellation module 105 through a digital matching filter 302 or a phase amplitude delay adjustor 400, a DAC 907, and an auxiliary transmitting TX analog channel part 908 (auxiliary TX channel). The signal output from the cancellation module 105 enters an ADC 910 and a detector 911 through an analog feedback channel, and is then output to a channel characteristic calculation control module 104-2, so that the channel characteristic calculation control module 104-2 controls the parameters of the digital matching filter 302 or the phase amplitude delay adjustor 400 according to the output signal to enable the carrier energy of a receiving channel to be cancelled effectively.

To achieve a good cancellation effect, the main TX channel 903 and the auxiliary TX channel 908 must share a local oscillator, wherein the auxiliary TX channel requires a high linearity; and during link allocation, the intermodulation component generated by the channel is required to be 10 dB lower than the DPD-improved nonlinear component transmitted by the channel.

In the implementing process of the embodiment of the disclosure, the channel characteristics of the main channel and the auxiliary channel can be evaluated by a software algorithm in combination with a hardware system and then matched accurately; and the flow of matching the software algorithm with the hardware system is as follows:

Step 010: The auxiliary channel signal is shut off, the main channel runs normally, and the channel characteristics between the splitting point and the ADC input are measured by a training sequence to obtain a first transmission function HM(f).

Step 020: The main channel signal is shut off, the auxiliary channel runs normally, and the channel characteristics between the splitting point and the ADC input are measured by a training sequence to obtain a second transmission function Hs(f).

Step 030: A compensation function ΔH(f)=−(HM(f)/Hs(f)) is calculated according to the first transmission function HM(f) and the second transmission function Hs(f).

Step 040: The parameters of the matching filter or the parameters of the phase amplitude delay adjustor 400 are adjusted according to the compensation function to obtain an initial adjustment result.

Step 050: Both the main channel and the auxiliary channel are turned on.

Step 060: The carrier energy of the feedback channel is detected periodically by a system. Specifically, an output signal obtained after combination is detected periodically by the system; and when the output signal is detected, the energy value of the output signal is acquired.

Step 070: Whether the carrier energy is below a target threshold level, i.e., an energy threshold, is judged. Specifically, the carrier energy value of the output signal is compared with the energy threshold; if the carrier energy value of the output signal is larger than the energy threshold, Step 090 is executed; otherwise, Step 080 is executed.

Step 080: If the carrier energy value is below the target level, the adjustment is stopped, namely, the channel characteristics of the main channel and the auxiliary channel are maintained, and Step 060 is executed.

Step 090: Zero-forcing optimizing and debugging are carried out according to the carrier energy of the feedback channel, namely, the channel characteristics of the main channel and the auxiliary channel are adjusted according to the carrier energy value of the output signal to enable the signal transmitted on the main channel and the signal transmitted on the auxiliary channel to cancel out each other; and then Step 060 is executed.

In a GSM900 multi-carrier base station system, carrier cancellation is carried out in the way shown in the fourth embodiment of the disclosure; a digital domain channel characteristic matcher carries out matching control with each carrier (200 KHz) as a unit, and carries out closed-loop control by a zero-forcing algorithm to improve the carrier cancellation by over 50 dB, wherein the GSM900 multi-carrier, i.e., four carriers, are allocated in the band of 25 MHz.

Figure 10:
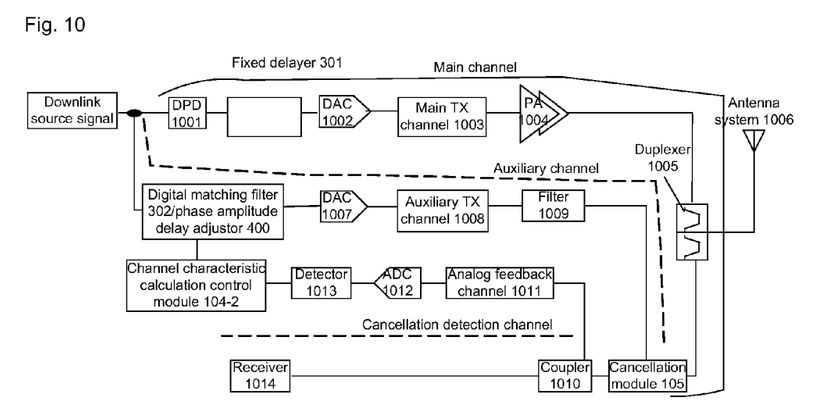
FIG. 10 is a diagram showing a composition structure of a digital control self-blocking cancellation device provided by a fifth embodiment of the disclosure.

FIG. 10 is a diagram showing a composition structure of a digital control self-blocking cancellation device provided by a fifth embodiment of the disclosure. As shown in FIG. 10, a FDD duplex receiver suppresses a TX carrier signal of a downlink channel to be below the level meeting the Automatic Gain Control (AGC) point of a receiving channel by a receiving filter of a passive duplexer without affecting the receiver, wherein the level of the AGC control point is located at the input end of a Low Noise Amplifier (LAN) of the receiver. In the fifth embodiment of the disclosure, the downlink carrier signal leaked by the duplexer is suppressed at the input end of the receiver by a digital control cancellation technology, which can share the suppression of a passive filter effectively.

Similar to the fourth embodiment of the disclosure, a signal cancellation point is placed only at the input end of the receiver. The splitting point for a main signal and an auxiliary channel can exist between a downlink source signal and the DPD1001 input. The main channel signal enters the duplexer 1005 from the splitting point through the DPD1001, the fixed delayer 301, the DAC1002, the main TX channel 1003 and then the PA 1004; the main energy of the duplexer 1005 is radiated out through an antenna system 1006 and some energy is leaked to the input end of the receiver to enter the cancellation module 105; and a coupler can be adopted only if the performance of the receiver is not affected.

The auxiliary channel signal enters the cancellation module 105 from the splitting point through the digital matching filter 302 or the phase amplitude delay adjustor 400, the DAC 1007, the auxiliary TX channel 1008, and then a filter 1009, wherein the pass band of the filter 1009 is a TX band, and the stop band is an RX band.

To obtain a good cancellation effect, the main TX channel 1008 and the auxiliary TX channel 1009 must share a local oscillator; the energy of nonlinear component and noise of the auxiliary TX channel 1008 in the RX band must be suppressed below the background noise, which is achieved by reasonable link budget and the suppression of the filter, wherein the cancellation point is taken as a reference surface when it is suppressed to the background noise.

During the implementation of the fifth embodiment of the disclosure, the characteristics of the main and the auxiliary channels can be evaluated by a software algorithm in combination with a hardware system, and then matched accurately, wherein the flow of the software algorithm is the same as the implementation flow of the feedback channel in the fourth embodiment of the disclosure, thereby needing no further description.

Figure 11:
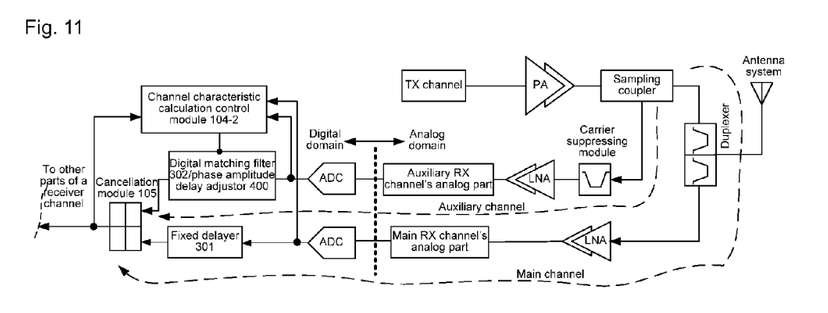
FIG. 11 is a diagram showing a composition structure of a digital control self-interference cancellation device provided by a sixth embodiment of the disclosure.

FIG. 11 is a diagram showing a composition structure of a digital control self-interference cancellation device provided by a sixth embodiment of the disclosure. As shown in FIG. 11, the device is an FDD duplex receiver self-interference cancellation device and functions to cancel out a spurious signal which is leaked from a downlink channel to a receiving band of a receiving channel. A spurious signal within the receiving band of a PA output end includes a non-linear component and a bottom noise generated by a downlink channel within the receiving band; and after the spuriousness of the receiving band is suppressed by a duplexer TX filter, some remained spuriousness is leaked to the receiving channel and cannot be suppressed by a filtering way within the receiving channel since they share one band with a received signal of the receiving channel. In the traditional way, it is ensured that the leakage of the spuriousness of the downlink channel does not affect the operation of the receiver by the sufficiently high suppression of the TX filter of the FDD duplexer.

The device provided by the sixth embodiment of the disclosure suppresses some spuriousness by signal cancellation to share the suppression of the duplexer TX filter. According to the description of the structure of the signal cancellation device, the input signal of the cancellation device is the spurious signal of the PA output within the receiving band, and the sampling coupler of the PA output end serves as the splitting point for the main channel and the auxiliary channel of the cancellation module 105.

The main channel signal, after being subjected to filtering suppression of the TX filter of the FDD duplexer, reaches an antenna port of a device; some energy is radiated out through the antenna port to form air interface spuriousness, and some energy enters an RX filter of the duplexer, and the spuriousness of the main channel passes through the RX filter without being suppressed; and the spurious signal enters an RX receiver after passing through the RX filter. The spurious signal reaches the cancellation module 105 of the digital domain along the RX receiver. During this process, it passes through an LNA, an RX radio-frequency filter, a frequency mixer, an intermediate frequency filter, an electric control attenuator, an intermediate frequency amplifier, an ADC and other links of the receiver.

The auxiliary channel signal acquires some input signals from a sampling coupler at the output end of a power amplifier, and the downlink carrier signal in the coupled and sampled signals is suppressed through a carrier suppressing module and a filter for the spuriousness in the RX band, in order to ensure that there is enough dynamic bandwidths on the auxiliary channel for the spurious signals in the RX band. The auxiliary channel signal subjected to carrier suppression enters the digital domain through the LNA, the frequency mixer, the intermediate filter, the electric attenuator, the intermediate amplifier, the ADC and other links.

The signal passes through the digital matching filter 302 or the phase amplitude delay adjustor 400 in the digital domain to enter the cancellation module 105; and the cancellation module 105 cancels out the two-channel input signals to output them to other parts of the RX channel, i.e., other parts of the receiver channel.

The channel characteristic calculation control module 104-2 in the sixth embodiment of the disclosure evaluates the difference between the main channel and the auxiliary channel by reading the signals output from the main channel ADC and the auxiliary channel ADC synchronously and performing correlation calculation, balancing calculation and the like on the two-channel signals, and gives the parameters matching the filter or the phase amplitude delay adjustor 400 according to the evaluation to cancel out the spurious signals of the main and auxiliary channels of the PA and the sampling coupler in the RX band, eliminate the self-interference leakage of the receiving channel and ensure that the received signal input from the antenna port is not interfered.

The following items need to be considered during the implementation of the embodiments of the disclosure:

1: The attenuation of the spuriousness in the RX band cannot be too large before a first-stage amplifier of the auxiliary channel. It is ensured that the spectrum density of the attenuated spuriousness in the RX band is XdB larger than the thermal noise spectrum density of the first-stage amplifier of the auxiliary channel and the whole link of the amplifier equivalent to the input port of the amplifier. The formula of X is: X=ζ+10 where, ζ is a target improvement amount of the self-interference cancellation device and has a unit of dB. For example, when the target self-interference cancellation amount is 40 dB, X=50 dB. Provided that the noise coefficient of the auxiliary channel equivalent to the first-stage amplifier is 5 dB, and the thermal bottom noise spectrum density is −109 dBm/MHz at the temperature of 25 degree centigrade, it is required that the spectrum density of the attenuated spuriousness in the RX band should not be larger than −59 dBm/MHz; and provided that the spectrum density of the spuriousness of the PA output end in the RX band is −30 dBm/MHz, the attenuation from the PA output port to the first amplifier RX cannot be larger than 29 dB.

2. The suppression amount of the carrier suppressing filter of the auxiliary channel meets the requirement of sufficient suppression on the carrier signal energy, and ensures that the spectrum density of the non-linear component generated by the carrier signal energy on the auxiliary channel is over 10 dB lower than the thermal bottom noise spectrum density.

3. The main channel and the auxiliary channel must share a local oscillator during the frequency mixing to obtain a good cancellation effect.

4. To parse the auxiliary channel signal effectively, it is required that the thermal bottom noise spectrum density level input from the auxiliary channel to the ADC should be over 10 dB higher than the own bottom noise of the ADC.

To sum up, the embodiments of the disclosure have the following technical effects: signals which share a same source and are transmitted on different paths can be cancelled at a target point to eliminate the leakage of signals, i.e., signal interference.

In the embodiments of the disclosure, all the splitting module, the digital domain channel characteristic matching executing module, the cancellation module and the channel characteristic calculation control module in the signal cancellation device for the wireless communication system, the fixed delayer, the digital matching filter, the phase amplitude delay adjustor and the combiner in the digital domain channel characteristic matching executing module, and the first detector, the first comparator, the first adjustor and the first maintainer in the channel characteristic calculation control module can be implemented by the processor of the wireless communication system or by a specific logic circuit. For example, in the actual application, they can be implemented by a Central Processing Unit (CPU), a Micro Processor Unit (MPU), a Digital Signal Processor (DSP) or a Field Programmable Gate Array (FPGA).

The above are only the preferred embodiments of the disclosure, and are not intended to limit the scope of protection of the claims of the disclosure.

INDUSTRIAL APPLICABILITY

In the embodiments, firstly, a transmitted signal is split to obtain a main channel signal transmitted on a main channel and an auxiliary channel signal transmitted on an auxiliary channel; secondly, the main channel signal and the auxiliary channel signal are subjected to digital domain channel characteristic matching processing respectively to obtain a main channel characteristic matched signal and an auxiliary channel characteristic matched signal; and finally, the main channel characteristic matched signal and the auxiliary channel characteristic matched signal which are coupled to a receiving channel are combined in order for signal cancellation; thus, in the embodiments, the channel characteristic matching control is implemented in a digital domain to enable the signals which share a same source and are transmitted in different paths to cancel out each other and eliminate signal leakage. Compared with an analog domain signal cancellation technology, the control is finer and the cancellation effect is good, so that the disclosure is particularly suitable for the signal cancellation of a broadband.

What is claimed is:

1. A signal cancellation method for a wireless communication system, comprising
splitting a transmitted signal to obtain a main channel signal transmitted on a main channel and an auxiliary channel signal transmitted on an auxiliary channel;
performing digital domain channel characteristic matching processing on the main channel signal and the auxiliary channel signal respectively to obtain a main channel characteristic matched signal and an auxiliary channel characteristic matched signal; and
combining the main channel characteristic matched signal and the auxiliary channel characteristic matched signal which are coupled to a receiving channel in order for signal cancellation;
after the combination, the method further comprising:
detecting an output signal obtained by the combination;
when the output signal is detected, comparing a carrier energy value of the output signal with an enemy threshold;
when the carrier energy value of the output signal is determined to be larger than the enemy threshold, adjusting channel characteristics of the main channel and the auxiliary channel according to the carrier enemy value of the output signal to enable the signal transmitted on the main channel and the signal transmitted on the auxiliary channel to cancel out each other; and
when the carrier energy value of the output signal is determined to be smaller than or equal to the energy threshold, maintaining the channel characteristics of the main channel and the auxiliary channel;
wherein the digital domain channel characteristic matching processing is performed by a processor of the wireless communication system.

2. The method according to claim 1, wherein the step of performing digital domain channel characteristic matching processing on the main channel signal and the auxiliary channel signal respectively to obtain a main channel characteristic matched signal and an auxiliary channel characteristic matched signal comprises:
performing digital domain fixed delay processing on the main channel signal transmitted on the main channel to obtain the main channel characteristic matched signal; and
performing digital domain matching filtering processing on the auxiliary channel signal transmitted on the auxiliary channel to obtain the auxiliary channel characteristic matched signal.

3. The method according to claim 1, wherein the step of performing digital domain channel characteristic matching processing on the main channel signal and the auxiliary channel signal respectively to obtain a main channel characteristic matched signal and an auxiliary channel characteristic matched signal comprises:
performing digital domain fixed delay processing on the main channel signal transmitted on the main channel to obtain the main channel characteristic matched signal; and
performing digital domain phase adjustment, amplitude adjustment and delay adjustment on the auxiliary channel signal transmitted on the auxiliary channel to obtain the auxiliary channel characteristic matched signal.

4. The method according to claim 1, wherein the step of performing digital domain channel characteristic matching processing on the main channel signal and the auxiliary channel signal respectively to obtain a main channel characteristic matched signal and an auxiliary channel characteristic matched signal comprises:
performing digital domain fixed delay processing on the main channel signal transmitted on the main channel to obtain the main channel characteristic matched signal; and
performing digital domain band splitting on the auxiliary channel signal transmitted on the auxiliary channel to obtain multiple auxiliary channel sub-signals;
performing matching filtering processing, or performing phase adjustment, amplitude adjustment and delay adjustment on each auxiliary channel sub-signal to obtain multiple auxiliary channel characteristic matched sub-signals; and
combining the multiple auxiliary channel characteristic matched sub-signals to obtain the auxiliary channel characteristic matched signal.

5. A signal cancellation device for a wireless communication system, comprising a splitting module, a digital domain channel characteristic matching executing module and a cancellation module, wherein
the splitting module is configured to split a transmitted signal to obtain a main channel signal transmitted on a main channel and an auxiliary channel signal transmitted on an auxiliary channel;
the digital domain channel characteristic matching executing module is configured to perform digital domain channel characteristic matching processing on the main channel signal and the auxiliary channel signal respectively to obtain a main channel characteristic matched signal and an auxiliary channel characteristic matched signal; and
the cancellation module is configured to combine the main channel characteristic matched signal and the auxiliary channel characteristic signal which are coupled to a receiving channel, in order for signal cancellation;

further comprising a channel characteristic calculation control module which comprises a first detector, a first comparator, a first adjustor and a first maintainer, wherein the first detector is configured to detect an output signal obtained by combination;

the first comparator is configured to, when the output signal is detected, compare a carrier enemy value of the output signal with an enemy threshold;

the first adjustor is configured to, when the carrier enemy value of the output signal is determined to be larger than the enemy threshold, adjust channel characteristics of the main channel and the auxiliary channel according to the carrier energy value of the output signal to enable the signal transmitted on the main channel and the signal transmitted on the auxiliary channel to cancel out each other; and the first maintainer is configured to, when the carrier energy value of the output signal is determined to be smaller than or equal to the enemy threshold, maintain the channel characteristics of the main channel and the auxiliary channel;

wherein the digital domain channel characteristic matching executing module is implemented by a processor of the wireless communication system.

6. The device according to claim 5, wherein the digital domain channel characteristic matching executing module comprises a fixed delayer and a digital matching filter;

the fixed delayer is configured to perform digital domain fixed delay processing on the main channel signal transmitted on the main channel to obtain the main channel characteristic matched signal; and the digital matching filter is configured to perform digital domain matching filtering processing on the auxiliary channel signal transmitted on the auxiliary channel to obtain the auxiliary channel characteristic matched signal.

7. The device according to claim 5, wherein the digital domain channel characteristic matching executing module comprises a fixed delayer and a phase amplitude delay adjuster, wherein the fixed delayer is configured to perform digital domain fixed delay processing on the main channel signal transmitted on the main channel to obtain the main channel characteristic matched signal; and the phase amplitude delay adjuster is configured to perform digital domain phase adjustment, amplitude adjustment and delay adjustment on the auxiliary channel signal transmitted on the auxiliary channel to obtain the auxiliary channel characteristic matched signal.

8. The device according to claim 5, wherein the digital domain channel characteristic matching executing module comprises a fixed delayer, multiple band-pass filters, a digital matching filter or a phase amplitude delay adjuster, and a combiner;

the fixed delayer is configured to perform digital domain fixed delay processing on the main channel signal transmitted on the main channel to obtain the main channel characteristic matched signal;

the multiple band-pass filters are configured to perform digital domain band splitting on the auxiliary channel signal transmitted on the auxiliary channel to obtain multiple auxiliary channel sub-signals;

the digital matching filter is configured to perform matching filtering processing on each auxiliary channel input sub-signal to obtain multiple auxiliary channel characteristic matched sub-signals;

the phase amplitude delay adjuster is configured to perform phase adjustment, amplitude adjustment and delay adjustment on the each auxiliary channel input sub-signal to obtain multiple auxiliary channel characteristic matched sub-signals; and the combiner is configured to combine the multiple auxiliary channel characteristic matched sub-signals to obtain the auxiliary channel characteristic matched signal.

* * * * *